(12) United States Patent
Tuineag

(10) Patent No.: US 9,920,850 B2
(45) Date of Patent: Mar. 20, 2018

(54) ADJUSTABLE PILOT OPERATED FLOW CONTROL VALVE

(71) Applicant: Griswold Controls, LLC, Irvine, CA (US)

(72) Inventor: Stefan I. Tuineag, Irvine, CA (US)

(73) Assignee: Griswold Controls, LLC, Irvine, CA (US)

( * ) Notice: Subject to any disclaimer, the term of this patent is extended or adjusted under 35 U.S.C. 154(b) by 10 days.

(21) Appl. No.: 15/018,693

(22) Filed: Feb. 8, 2016

(65) Prior Publication Data

US 2017/0227134 A1    Aug. 10, 2017

(51) Int. Cl.
| F16K 17/06 | (2006.01) |
| F16K 17/10 | (2006.01) |
| G05D 16/10 | (2006.01) |
| F16K 31/124 | (2006.01) |

(52) U.S. Cl.
CPC .............. *F16K 17/06* (2013.01); *F16K 17/10* (2013.01); *F16K 31/124* (2013.01); *G05D 16/106* (2013.01)

(58) Field of Classification Search
CPC ......... F16K 17/06; F16K 17/10; G05D 16/06; Y10T 137/777; Y10T 137/7762; Y10T 137/87193; Y10T 137/2514; Y10T 137/2516; Y10T 137/2541; Y10T 137/2574; Y10T 137/2605; Y10T 137/2617; Y10T 137/2625; Y10T 137/2635; Y10T 137/7796; Y10T 137/7798; Y10T 137/7793; Y10T 137/7805; Y10T 137/87917

USPC .......................... 137/492.5, 505, 115.23, 488
See application file for complete search history.

(56) References Cited

U.S. PATENT DOCUMENTS

| 1,627,628 | A | * | 5/1927 | Anderson | G05D 16/18 137/492 |
| 1,769,612 | A | * | 7/1930 | Wettstein | G05D 13/00 137/12 |
| 2,278,952 | A | * | 4/1942 | Soderberg | G05D 16/163 137/102 |
| 2,309,848 | A | * | 2/1943 | King | G05D 16/163 137/484.2 |
| 2,611,218 | A | * | 9/1952 | Paulsen | G05D 16/163 137/485 |
| 2,624,980 | A | * | 1/1953 | Hughes | G05D 16/163 137/115.07 |
| 3,911,947 | A | * | 10/1975 | Boxall | F16K 17/20 137/505.14 |

(Continued)

*Primary Examiner* — Minh Le
(74) *Attorney, Agent, or Firm* — K. David Crockett, Esq.; Crockett & Crockett, PC

(57) ABSTRACT

A flow control valve including a main valve and a pilot valve for controlling a piston of the main valve. The pilot valve is controlled in part with relatively high pressure fluid ported from a high pressure port of a flow sensor and relatively low pressure fluid ported from a low pressure port of a flow sensor, and also controlled with a control fluid applied to a control plate acting on a compression spring to bias the pilot valve. The pressure in the control fluid is controlled by pressurizing a control fluid reservoir with a mechanism accessible from outside the valve and the piping in which the valve is installed. The flow sensor and the reservoir are preferably disposed within the flange of the valve.

9 Claims, 6 Drawing Sheets

(56) References Cited

U.S. PATENT DOCUMENTS

| | | | | |
|---|---|---|---|---|
| 4,250,913 A | * | 2/1981 | Scull | F16K 31/385 |
| | | | | 137/116.5 |
| 5,992,449 A | * | 11/1999 | Sprague | F16K 17/10 |
| | | | | 137/488 |
| 6,076,549 A | * | 6/2000 | Bahat | F16K 31/1221 |
| | | | | 137/505 |
| 6,371,156 B1 | * | 4/2002 | Walton | G05D 16/166 |
| | | | | 137/106 |
| 8,136,545 B2 | * | 3/2012 | Jablonski | G05D 16/163 |
| | | | | 137/492 |
| 8,967,175 B2 | * | 3/2015 | Azoulay | F16K 31/124 |
| | | | | 137/14 |

* cited by examiner

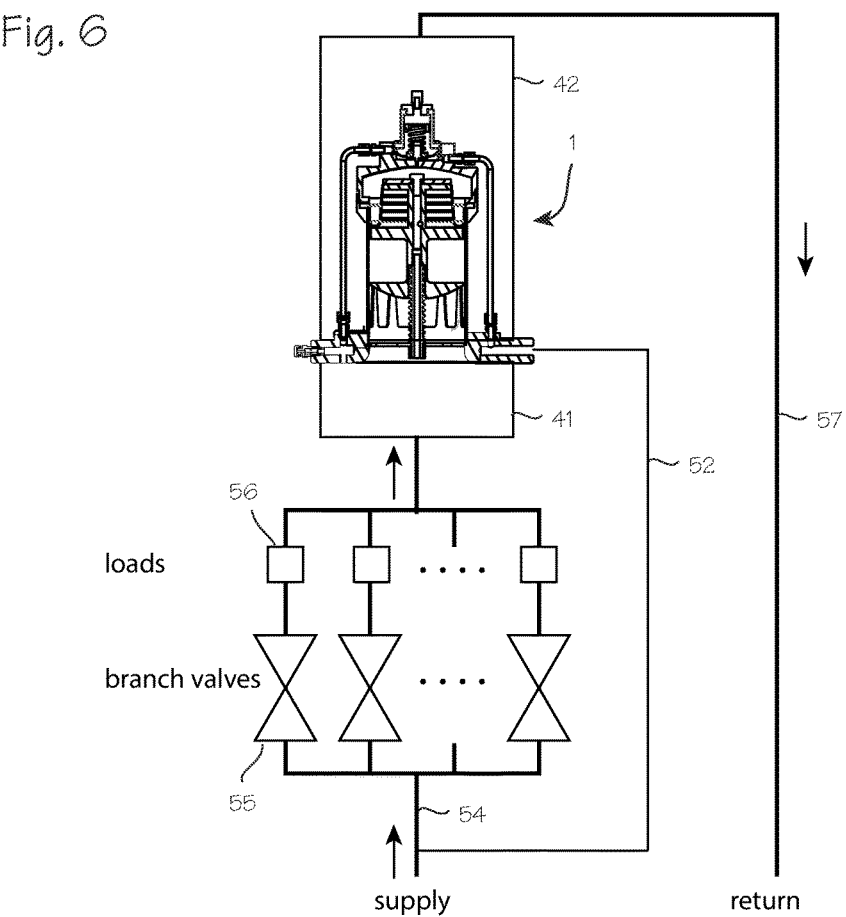

ADJUSTABLE PILOT OPERATED FLOW CONTROL VALVE

FIELD OF THE INVENTIONS

The inventions described below relate the field of flow control valves.

BACKGROUND OF THE INVENTIONS

Current flow control valves used in HVAC systems, such as our Griswold® wafer control valves, are installed in high flow applications and operate to maintain a constant fluid flow rate through a piping system despite fluctuations in the pressure of the fluid supply. These valves are not adjustable after installation, so that they must be removed and replaced to obtain a flow rate different from the flow rate provided by the valve.

SUMMARY

The devices described below provide for easy adjustment of flow through an installed flow control valve. The flow control valve includes a main valve comprising a piston operable to translate within an outlet tube to variable block outlet apertures in the outlet sleeve, and a pilot valve for controlling the piston of the main valve. The pilot valve is controlled in part with relatively high pressure fluid ported from the high pressure inlet of a flow sensor and relatively low pressure fluid ported from a lower pressure region of a flow sensor, applied to a pilot valve diaphragm, and also controlled with a control fluid applied to a compression spring to bias the pilot valve. The pressure in the control fluid is controlled by pressurizing a control fluid with a mechanism accessible from outside the valve and the piping in which the valve is installed. The control fluid may include a reservoir in the valve flange and a control fluid chamber in the pilot valve, and a control fluid line connecting the two. The flow sensor is preferably a Venturi nozzle formed by the inlet bore of the main valve which is formed in the mounting flange of the valve. The reservoir is preferably disposed, entirely or in part, within the flange of the valve, and is capped off with a screw or plunger, accessible from the outer perimeter of the flange, which can be driven in or out to increase or decrease the pressure in the reservoir, and thereby change the pressure set point of the pilot valve, which in turn changes the flow rate through the main valve.

BRIEF DESCRIPTION OF THE DRAWINGS

FIG. 6 is a schematic of a piping system, such as an HVAC system, in which the valve of FIG. 5 may be used.

DETAILED DESCRIPTION OF THE INVENTIONS

Figure 1:
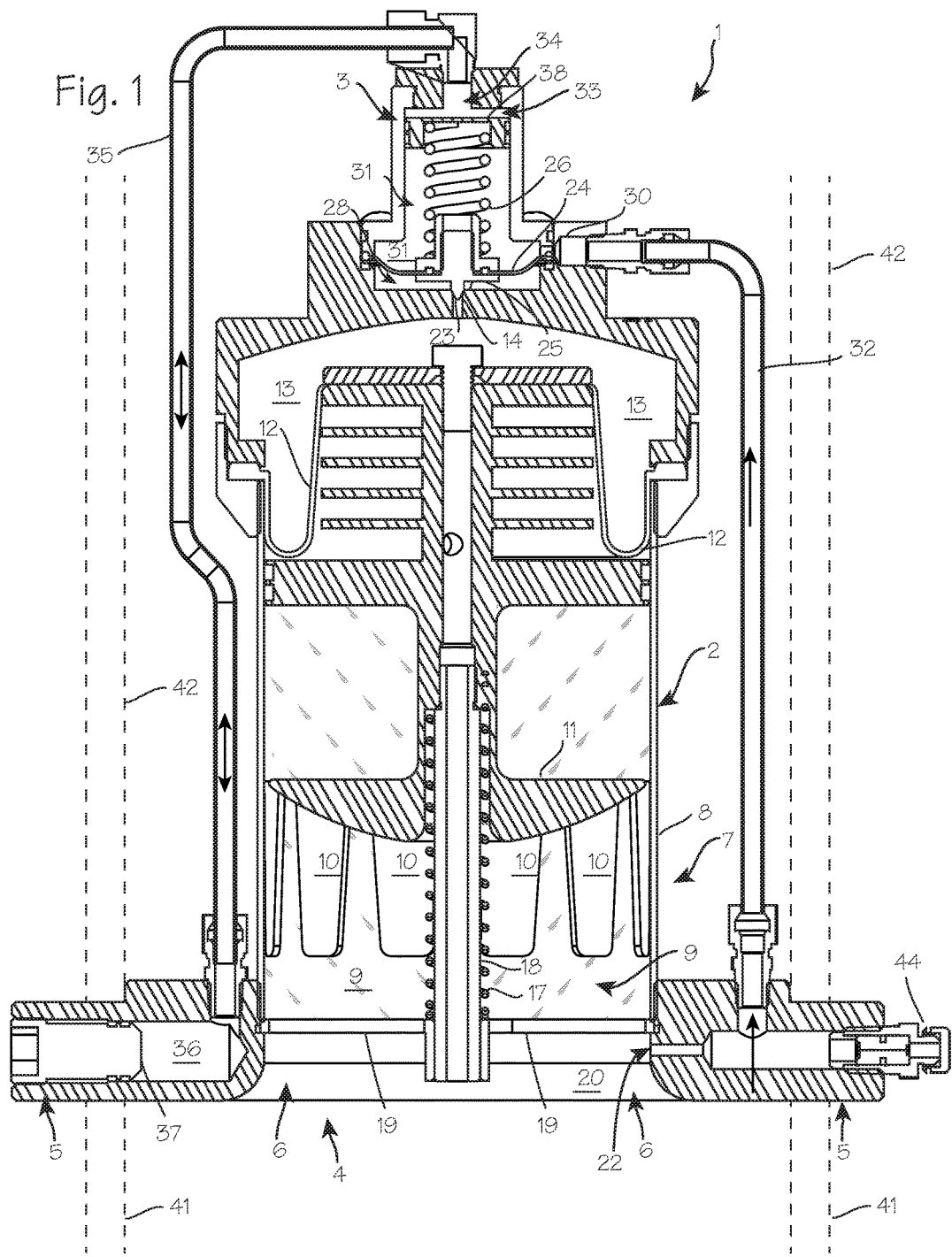
FIG. 1 is a cross section of the flow control valve, showing the control fluid source and the low pressure input, and their respective connections to the pilot valve.

FIG. 1 is a cross section of the flow control valve, 1 showing the major components including the control fluid source and the low pressure input, and their respective connections to the pilot valve. The flow control valve is an assembly composed of a main valve 2 and a pilot valve 3. The main valve portion includes a main valve inlet 4, which is formed in the flange 5 with a bore 6, and an outlet 7 formed of a outlet tube 8 with a bore 9 providing a fluid pathway to several outlet apertures 10 in the side wall of the outlet tube. The piston 11 and an everting diaphragm 12 of main valve 2 are disposed within the bore of the tube 8. This piston is operable, through operation of the pilot valve and subsequent pressurization and eversion of the everting diaphragm 12, to move longitudinally within the tube 8, toward the main valve inlet to occlude a portion of the apertures to control the rate of flow through the main valve, and, upon depressurization and inversion of the everting sleeve, away from the main valve inlet to open greater portions of the apertures to fluid flow. Above the piston and surrounding the everting sleeve, the main valve operating chamber 13 is configured to receive pressured fluid from the pilot valve through the pilot valve output port 14, and bleed pressurized fluid from the operating chamber through the relief port 15 and relief line 16 (both shown in FIG. 2). The main valve also includes a return spring 17 disposed about a shaft 18, trapped between the piston 11 and a spring support 19. The shaft serves to stabilize translation of the piston 11 within the outlet tube 8, and the spring 17 (a compression spring) serves to bias the piston toward the open, downstream position away from the main valve inlet. In this embodiment, the inlet 4 and bore 6 are configured to form a Venturi nozzle 20, so that the flow through the main valve inlet can be determined by measuring the pressure at the inlet and the outlet of Venturi nozzle itself through high pressure sensing port 21 (in FIG. 2) and low pressure sensing port 22 (in FIG. 1).

The pilot valve includes a plunger 23 fixed to a pilot valve diaphragm 24. Depending on pressures above and below the pilot valve diaphragm 24 and resultant deformation of the diaphragm, the plunger will seat on, or lift off of, the pilot side 25 of the pilot valve output port 14. The diaphragm and pilot plunger are fixed to the compression spring 26, which biases the diaphragm and plunger toward the pilot valve output port 14. The pilot valve includes a high pressure port 27 (shown in FIG. 2) communicating with the high pressure chamber 28 under the diaphragm, and in fluid communication with the upstream, high pressure side of the main valve flange 5 through the high pressure sensing line 29 and high pressure sensing port 21, and a low pressure port 30 communicating with the low pressure chamber 31 above the diaphragm, and in fluid communication with the outlet of the inner bore of the Venturi nozzle 20 through the low pressure sensing line 32 and the downstream low pressure sensing port 22.

Downward bias on the pilot valve diaphragm and plunger may be adjusted by pressurizing the control fluid in the control fluid chamber 33. Most conveniently, this is accomplished through control fluid port 34, control fluid line 35 and control fluid reservoir 36 in the flange. A screw or plunger 37 disposed in the flange to cap the reservoir is operable to increase or decrease the pressure of the control fluid, and thus increase or decrease the compressive force applied by the biasing plate 38 on the compression spring 26, thus altering the pressure differential across the diaphragm necessary to lift the plunger off of its seat. The screw or plunger is disposed within the reservoir, with the head accessible from the outer surface of the flange, either from the outer circumference of the flange or one of the upstream or downstream faces of the flange which extends beyond the outer surfaces of the conduit in which the valve is installed. The control fluid reservoir, depicted here disposed within the flange, may comprise the control fluid line, and may be disposed entirely or partly within the flange, and may consist of a tube similar to the control fluid line, so long as the means for pressurizing the control fluid chamber is operable from outside the valve, and outside the conduit, after installation.

Figure 2:
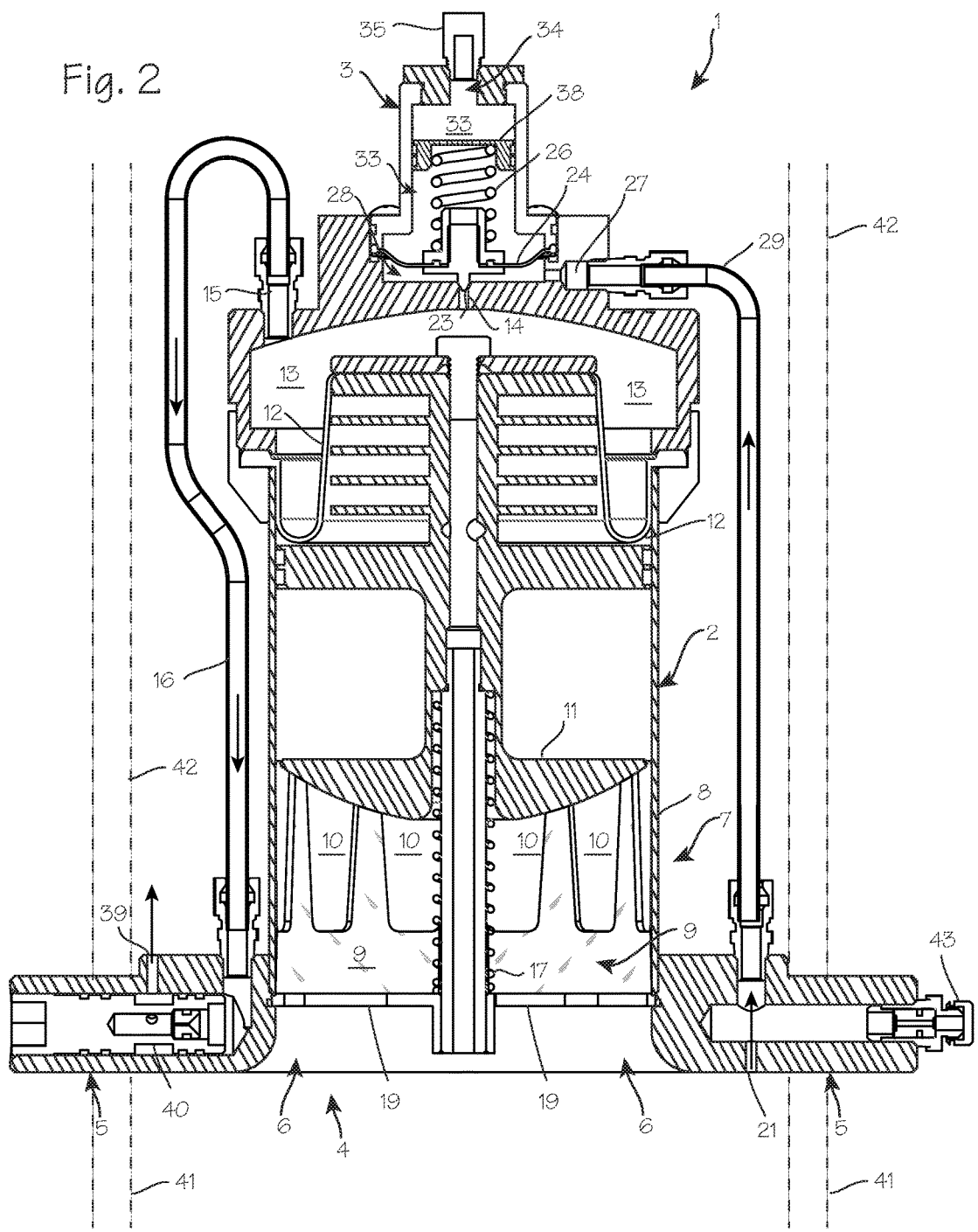
FIG. 2 is a cross section of the flow control valve, showing the relief pathway for the high pressure fluid that operates the main piston of the valve, the high pressure input, and their respective connections to the valve.

FIG. 2 is a cross section of the flow control valve, showing the relief pathway for the high pressure fluid that operates the main piston 11 of the valve, and the high pressure input, and their respective connections to the valve. The structures of the main body portion are as shown and described in relation to FIG. 1. This view shows the high pressure sensing line 29 communicating from the upstream, high pressure side of the valve through high pressure sensing port 21 to the pilot valve high pressure chamber 28 on the inlet side of the diaphragm through high pressure port 27, and also shows the relief path for the main valve operating chamber 13, which includes the relief port 15 and a relief line 16 which is in fluid communication with the relief outlet port 39 which opens to the downstream, low pressure side of the flange and passes through filter 40.

The flow rate through the valve may be adjusted by altering the pressure of the control fluid, which in turn alters the pressure set point of the pilot valve (in the embodiment shown in the figures, the set point is the pressure differential across the pilot valve diaphragm 24 required to lift the diaphragm and move the pilot valve plunger 23 out of occlusive contact with the pilot valve outlet 25). To increase the flow rate through the main valve, the screw is driven inward, to increase the pressure in the control fluid reservoir and move the spring plate 38 from a neutral mid-position toward the main valve inlet 4 (and away from the control fluid port 34), and thus increase the closing bias on the compression spring. This increases the pressure differential across the diaphragm necessary to lift the plunger. This tends to close the plunger/outlet, letting pressure above the everting sleeve bleed off through the relief line, and this tends to allow the piston to move away from the inlet to open a larger portion of the outlet apertures 10. Flow through the main valve will reach the rate necessary to create the pressure differential that balances the pressure on the everting sleeve achieved by the high pressure in the high pressure chamber above the sleeve, (as reduced by the head loss in the line, the aperture, and as reduced by exit through the relief port and relief line) with the pressure of fluid below the piston. To decrease the flow rate through the main valve, the screw is driven outward, to decrease the pressure in the control fluid reservoir and move the spring plate 38 from a neutral mid-position away from the inlet, and thus decrease the closing bias on the compression spring. This decreases the pressure differential across the diaphragm necessary to lift the plunger. This tends to open the plunger/outlet, applying more pressure to above the everting sleeve (even while pressure is bleeding off), and this tends to force the piston to move toward the inlet and close off more of the outlet apertures 10.

Figure 3:
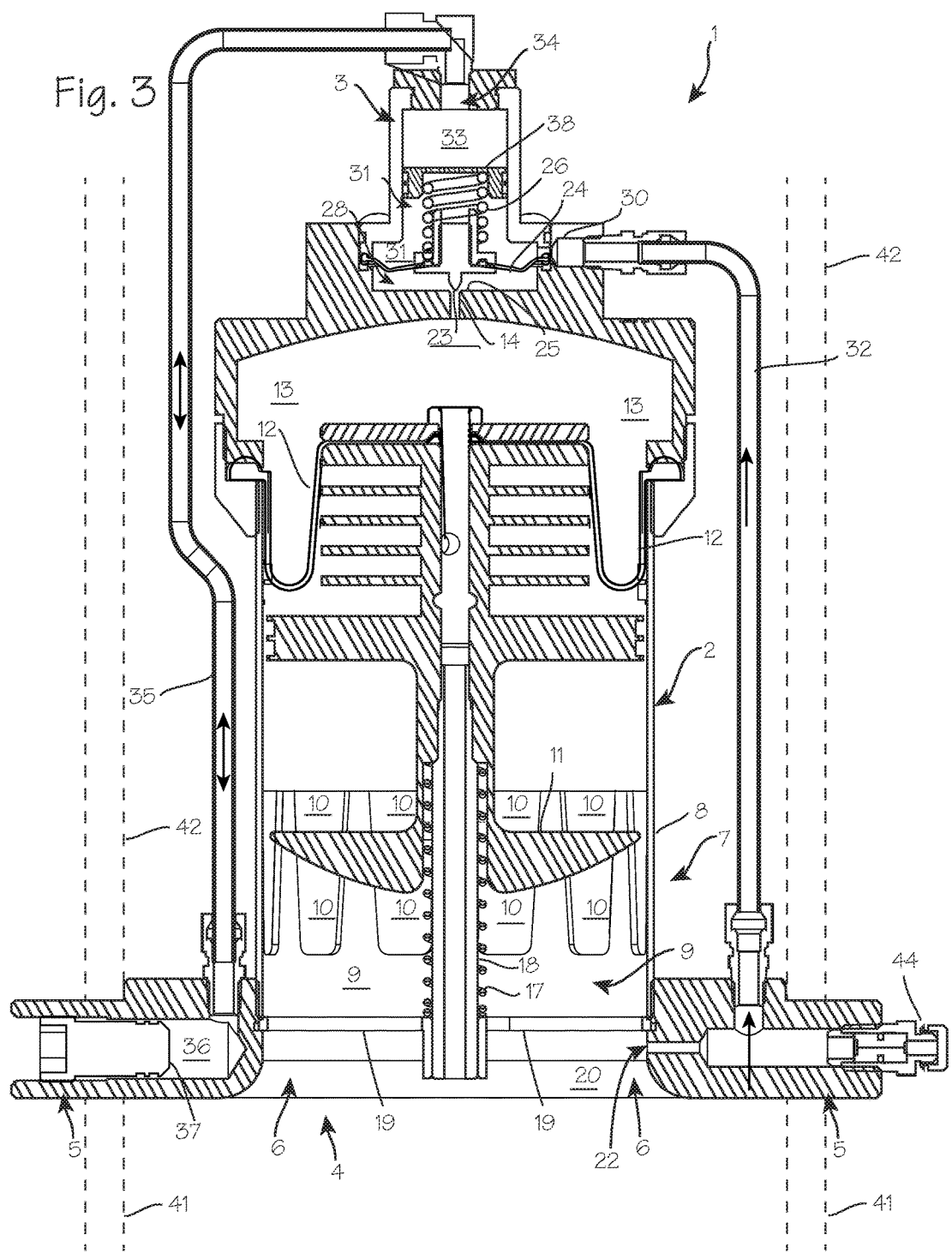
FIG. 3 is a cross section of the flow control valve, corresponding to FIG. 1, showing the closing movement of the piston of the main valve in response to an increase in pressure in the high pressure line relative to the low pressure line.

FIG. 3 is a cross section of the flow control valve, corresponding to FIG. 1, showing the closing movement of the piston of the main valve in response to an increase in pressure in the high pressure line relative to the low pressure line, as described in the preceding paragraph. In this figure, the screw 37 has been driven inward, to increase the pressure on the biasing plate 38. The biasing plate is shown shifted toward the diaphragm, compressing the compression spring 26. When pressure rises upstream of the valve, the higher pressure is transmitted to the pilot valve high pressure side (chamber 28). At sufficiently high pressure vis-à-vis the outlet pressure, the diaphragm lifts and the plunger 23 is moved out of the pilot valve outlet port 14, and the everting sleeve is pressurized and is everted and the piston is forced toward the inlet 4 of the main valve (away from the control fluid inlet), so that the piston blocks portions of the apertures 10 in outlet tube 8, thus reducing flow through the valve.

As shown in the previous figures, the valve is installed in a pipe system, with an upstream pipe 41 and a downstream pipe 42, establishing respective upstream and downstream sides of the flow control valve. The flange 5 may be secured between flanges of the upstream and downstream pipes, or it may be welded in place. The inlet 4, which is preferably formed integrally within the flange, is disposed in the piping facing the upstream, high pressure side, with the main valve disposed downstream of the inlet and flange, and the pilot valve disposed downstream of the main valve. The main valve and the pilot valve are preferably, as illustrated, coaxially aligned with the inlet (and the upstream pipe) and coaxially aligned with each other, and coaxially aligned with the conduit in which it is installed.

Figure 4:
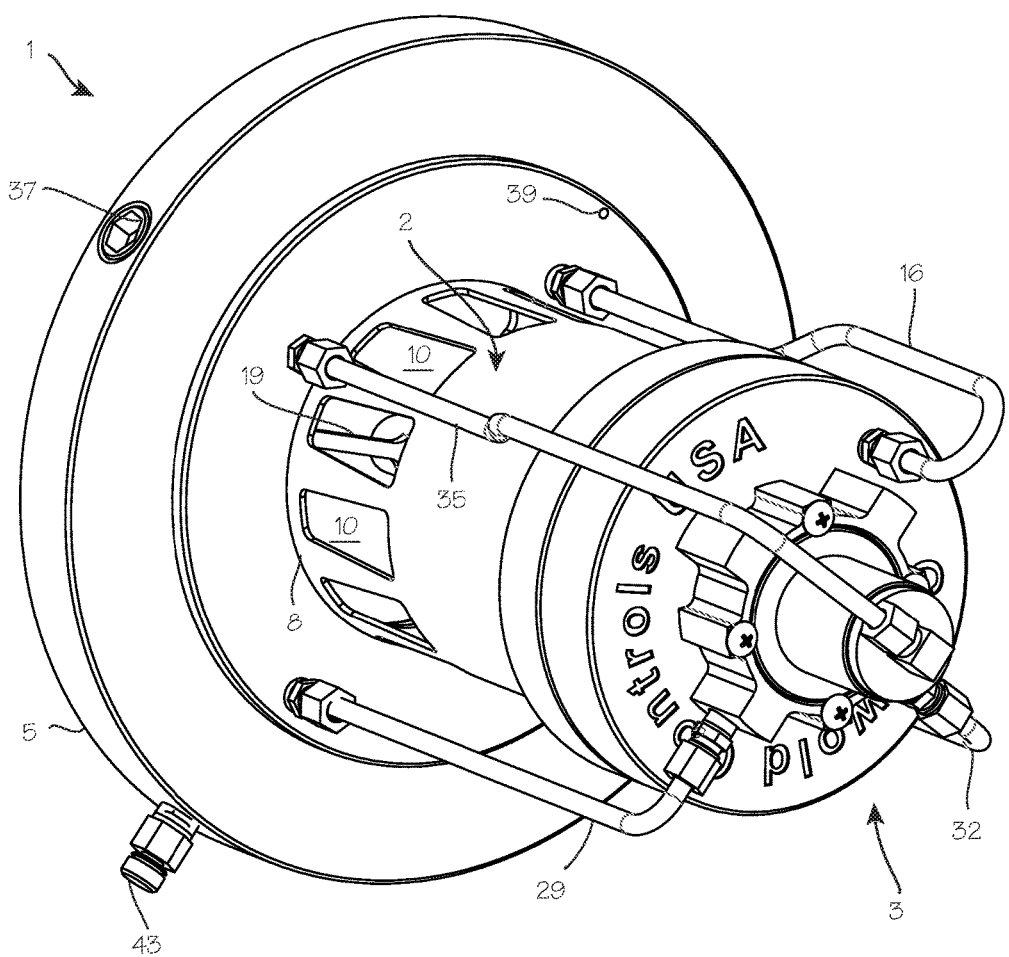
FIG. 4 is a perspective view of the flow control valve.

FIG. 4 is a perspective view of the flow control valve, from the upstream side of the valve. The various structures visible from the outside of the flow control valve include the main valve 2, the pilot valve 3, the outlet tube 8 with its several apertures 10, the control fluid line 35, the high pressure line 29, the low pressure line 32, and the relief line 16, and also a view of the spring support plate 19 showing its several large apertures, and caps on the high pressure sensing PT port 43. The valve will typically be installed using flanges of the upstream pipe and downstream pipe to secure the valve within the fluid pathway, with the main valve and pilot valve in the downstream side of the pathway.

The flow control valve of FIGS. 1 through 4 is easily adjustable after installation in a pipe. In use, the valve is installed in a large pipe, with the upstream piping secured to the inlet face of the flange, and the downstream piping secured to the downstream face of the flange, such that the relief port 39 empties into the open bore of the outlet pipe, and the high pressure sensing port 21 in the flange is open to the bore of the inlet pipe. A high pressure PT port 43 and a low pressure PT port 44 and the control fluid adjustment screw 37 are accessible from the outer surface of the flange, either from the outer circumference of the flange or one of the upstream or downstream faces of the flange which extend beyond the outer surfaces of the conduit, so that they are accessible from outside the pipes after installation ("PT port" is the term used to refer to a pressure and/or temperature test port). The PT ports, as illustrated, communicate with the pressure sensing ports 21 and 22, but they may communicate with high pressure and low pressure regions of the Venturi nozzle through separate additional sensing ports. During operation of any system that the valve is installed in, fluid flowing through the pipe will pass through the Venturi nozzle, creating differing pressures at the high pressure sensing port 21 on the inlet face of the flange and the low pressure sensing port 22 near the outlet of the nozzle. Flow through the valve can be readily determined by measuring the inlet and outlet pressures (and, optionally, fluid temperatures), and referring to a chart which indicates the corresponding flow or entering these numbers into a calculator programmed to calculate or look up the corresponding flow rate (the relationship between flow rate and measured inlet and outlet pressures is dependent on the particular geometry of the Venturi nozzle). To adjust the flow rate, an operator need only move the screw inward or outward.

Figure 5:
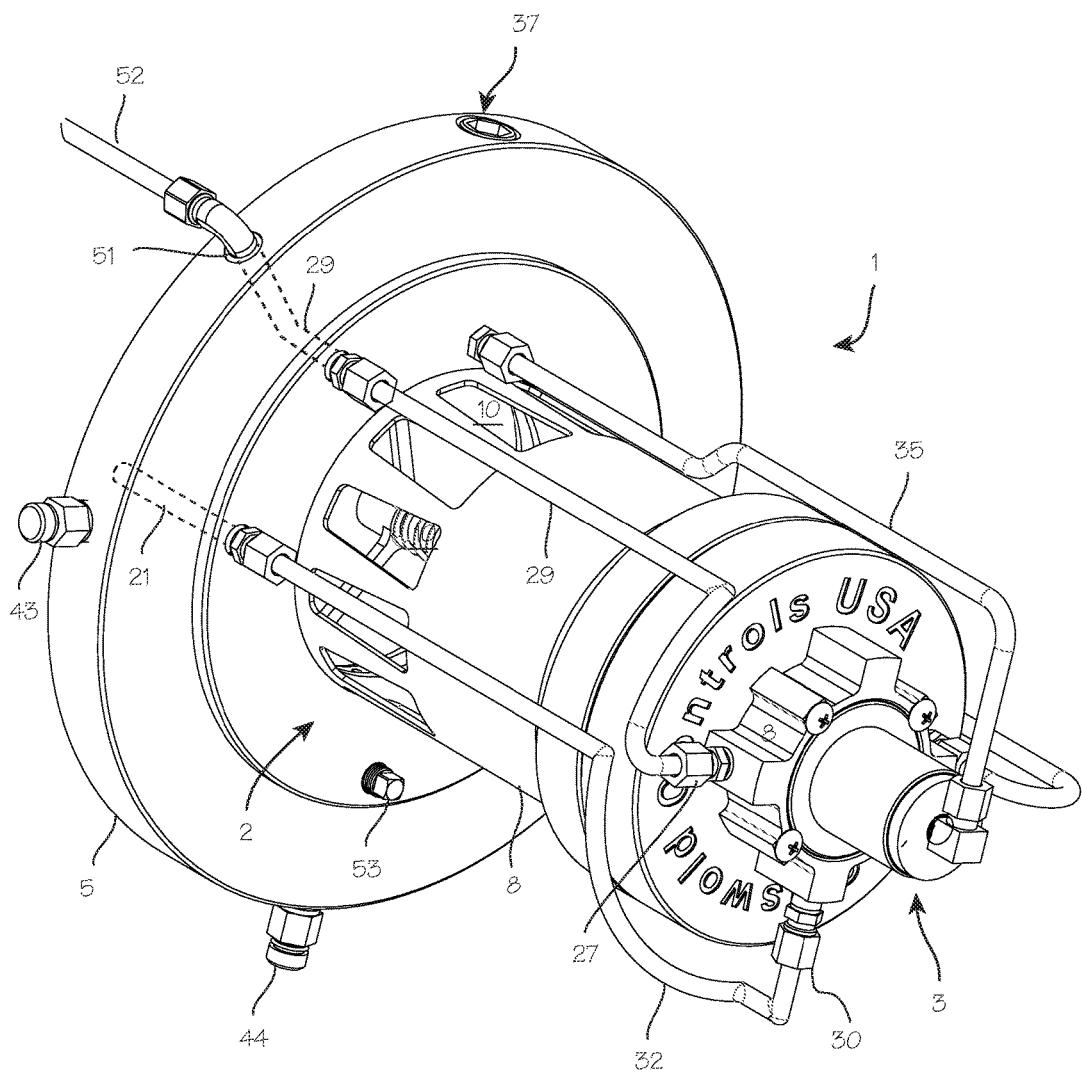
FIG. 5 is a perspective view of a flow control valve, similar to the valve of the previous figures, with inputs adapted to control flow through one or more other valves in a piping system, or control overall flow through a system in which other valves are used to control flow in branches of the system.

FIG. 5 is a perspective view of a flow control valve 1, similar to the valve of the previous figures, with inputs adapted to control flow through one or more other valves in a piping system, or control overall flow through a system in which other valves are used to control flow in branches of the system. This valve operates much the same as the valve shown in FIGS. 1 and 2, with different sensing ports aligned to the low pressure port to the pilot valve and the high pressure port to the pilot valve. The high pressure port 27 (into the pilot valve) and high pressure sensing line 29 are aligned through the flange to a new high pressure sensing port 51, with a high pressure port sensing line extension 52 which is in fluid communication with the upstream, high pressure side of a valve or a number of valves, elsewhere in the piping system in which the valve 1 is installed. The low pressure port 30 (into the pilot valve) and low pressure sensing line 32 are aligned to the port referred to as the high pressure port in FIG. 2, which now serves as the low pressure sensing port, still marked as item 21. This port is on the upstream face of the flange, and is exposed to pressure upstream of the flow control valve 1. (The low pressure sensing port 22, shown in FIG. 1, is not used for control of the pilot valve in this Figure.) With this configuration, the pressure differential between the inlet or supply of the other valve, and the pressure at the inlet of the flow control valve 1, are used to control the pilot valve 3, with the pressure at the inlet of the other valve being the high pressure which is ported to the high pressure chamber of the pilot valve, and the pressure at the inlet of the flow control valve being the low pressure which is ported to the low pressure chamber of the pilot valve. The pressure differential set point for the pilot valve is adjusted, as shown in relation to FIG. 1, with the pressurizing means 37 acting on the fluid in the control fluid chamber through the control fluid line 35 and any intervening reservoir in the flange. The flow through the valve may still be measured, using the PT port 43, connected, as in FIGS. 1 and 2, to the face of the flange through sensing port 21, and using the PT port 44 to sense the low pressure region of the nozzle through sensing port 22 (shown in FIG. 2). (In this figure, the high pressure port 21 used for measuring pressure at the inlet of the valve is the same as the port used to provide feedback from the low pressure side of controlled valves, while the low pressure port 22 is used only for measuring pressure at the outlet of the nozzle is not used for feedback pilot valve. In FIG. 5, the pathway from the low pressure region of the nozzle to the low pressure chamber of the pilot valve used in the valve of FIG. 1 is not used, and if the flange construction is not altered, a plug 53 may be installed to seal that pathway.)

FIG. 6 is a schematic of a piping system, such as an HVAC system, in which the valve of FIG. 5 may be used. The system may include a supply line 54, any number of valves 55 in various branches used to adjust flow to various loads 56, the control valve 1 installed in conduit comprising the upstream and downstream pipes 41 and 42, and a return line 57. In an HVAC system, the valves may be inexpensive pressure independent control valves (such as Griswold PIC-V®, MVP® and PIM valves), manually operated ball valves or throttle valves, and the loads might be individual rooms to be supplied with fluid through a main supply pipe, a manifold or bank of branch valves, the flow control valve, and a return. As shown in this figure, the control valve is installed in the overall piping system, in the return line or in the supply line, with the high pressure sensing line extension 52 communicating from the high pressure sensing port 51 in the flange and high pressure line 29 to the supply line 54, upstream of the branch valves 55. The high pressure in the supply line is communicated to the high pressure chamber in the pilot valve through this pathway.

Preferably, the inlet bore is configured to create a Venturi nozzle or similar nozzle which creates differential pressure between the high pressure sensing port 21 and the downstream, low pressure sensing port 22. The Venturi nozzle illustrated in the figures is a convenient means for measuring the flow rate through the valve, but other flow meter structures may be used while still obtaining the benefits of the easily adjusted flow control valve. Alternate flow measuring means may include orifice plate flow sensors, Venturi tubes, pitot tubes, turbine flow meters, and positive displacement meters, rotometers, vortex-shedding sensors, fluid-oscillator meters, jet-deflection meters, magnetic piston flowmeters, magnetic flow sensors, or laser-doppler flow sensors.

The screw is provided as a convenient means for adjusting pressure of the control fluid in the control fluid chamber over the spring plate in the pilot valve. Other means can be used to pressurize the control fluid, including pumps (a bladder pump, for example) combined with a check valve and a bleed valve, a piston slidable and/or translatable within the bore with locking mechanisms such as detent balls, spring clips, etc., electronically actuated pistons, motor driven (electric or pneumatic) or solenoid driven pistons or screws, wax actuators, etc., as long as those mechanisms can be adjusted from outside the associated conduit or piping system after installation of the valve.

The main valve is most conveniently formed as describe above. The main valve provides a means for throttling flow through the flow control valve. The main valve may be provided in alternative structures which provide a means for throttling flow, including a needle throttle valve, a rolling diaphragm valve, a globe valve or other valve suitable for throttling flow through the piping system.

The valve may be provided in various sizes, with apertures and piston movement configured for control within various ranges of flow rates. When constructed as illustrated above, a valve operable within a given range of flow rates will be much lighter that a comparable wafer valve.

The benefits of the various inventive concepts disclosed above can be achieved alone or in combination. For example, the benefits of forming the inlet in the mounting flange, and configuring the bore of the inlet as a Venturi nozzle or tube useful to measure flow, may be achieved without also disposing the control fluid reservoir and control fluid pressurizing mechanism also in the flange (and instead using other means to pressurize the control fluid), and the benefits of disposing the control fluid reservoir in the flange may be achieved without also disposing the flow measuring structures in the flange. Likewise, the benefits of using the piston and everting diaphragm as the main valve may be obtained while using other means to measure flow and adjust the set point of the pilot valve.

As described above in relation to FIGS. 1 and 2, the flow control valve generally includes the main valve (2) with its inlet 4 and outlet 7, with the main valve operable to throttle fluid flow through the conduit (41, 42). The main valve is controlled by the pilot valve (3), which is operable to control a position of the main valve (2). The pilot valve has a control fluid chamber (33) filled with control fluid, and the pressure of control fluid in the control fluid chamber determines a pressure set point of the pilot valve. A high pressure sensing port (21) is disposed in a high pressure region proximate the inlet of the main valve (2), and is in fluid communication with the pilot valve (3), while a low pressure sensing port 22 is disposed in a low pressure region downstream of the high pressure sensing port (21), and is in fluid communication with the pilot valve (3). A means for pressurizing the control fluid in the control fluid chamber, for example the screw or plunger (37), is operable from the outside of the conduit after the valve is installed in the conduit. Most conveniently, the flow measuring mechanisms, pilot valve sensing ports, PT ports, and control fluid pressuring means are all located in the mounting flange of the valve, which simplifies construction of the valve and provides for easy access to the PT ports and the pressurizing means.

As describe above in relation to FIGS. 5 and 6, the flow control valve generally includes the main valve (2) with its inlet 4 and outlet 7, with the main valve operable to throttle fluid flow through the conduit (41, 42). The main valve is controlled by the pilot valve (3), which is operable to control a position of the main valve (2). The pilot valve has a control fluid chamber (33) filled with control fluid, and the pressure of control fluid in the control fluid chamber determines a pressure set point of the pilot valve. The flow control valve is installed in a piping system with a number of branches, and a valve installed in each branch to control (at least partially) the flow through each branch. A first pressure sensing port (21) is disposed in a region of lower pressure relative to the supply to one or more valves in an associated piping system, proximate the inlet of the main valve (2), and is in fluid communication with the pilot valve (3), while a second pressure sensing port 22 is disposed in a high pressure region upstream of the first pressure sensing port (21) and a valve or valves elsewhere in the system, and is in fluid communication with the pilot valve (3). The overall system can include any number of additional valves controlling flow to branches in the piping system. A means for pressurizing the control fluid in the control fluid chamber, for example the screw or plunger (37), is operable from the outside of the conduit after the valve is installed in the conduit. Most conveniently, the flow measuring mechanisms, pilot valve sensing ports, PT ports, and control fluid pressuring means are all located in the mounting flange of the valve, which simplifies construction of the valve and provides for easy access to the PT ports and the pressurizing means.

In the figures, the sensing ports 21 and 22 are used both for communicating to the pilot valve and for communicating to the PT ports. Instead, a separate sensing port may be provided to provide fluid communication from the flow in the conduit to each of the pilot valve high pressure chamber, the pilot valve low pressure chamber, the high pressure PT port and the low pressure PT port.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

I claim:

1. A flow control valve for controlling flow through a conduit characterized by an inlet pipe and an outlet pipe comprising:
    a main valve (2) having an inlet 4 and an outlet 7, said main valve operable to throttle fluid flow through a conduit (41, 42);
    a pilot valve (3) operable to control a position of the main valve (2), said pilot valve having a control fluid chamber (33), wherein the pressure of control fluid in the control fluid chamber determines a pressure set point of the pilot valve;
    a high pressure sensing port (21) disposed in a high pressure region proximate the inlet of the main valve (2), and in fluid communication with the pilot valve (3);
    a low pressure sensing port (22) disposed in a low pressure region downstream of the high pressure sensing port (21), and in fluid communication with the pilot valve (3);
    means for pressurizing the control fluid in the control fluid chamber (37), said means for pressurizing the control fluid operable from the outside of the conduit after the valve is installed in the conduit.

2. The flow control valve of claim 1 further comprising:
    a flange (5) secured to the main valve; wherein
    the means for pressurizing the control fluid (37) is disposed at least partially within the flange.

3. A flow control valve for controlling flow through a conduit characterized by an inlet pipe and an outlet pipe comprising:
    a main valve (2) having an inlet 4 and an outlet 7, said main valve operable to throttle fluid flow through a conduit (41, 42);
    a pilot valve (3) operable to control a position of the main valve (2), said pilot valve having a control fluid chamber (33), wherein the pressure of control fluid in the control fluid chamber determines a pressure set point of the pilot valve;
    a high pressure sensing port (21) disposed in a high pressure region proximate the inlet of the main valve (2), and in fluid communication with the pilot valve (3);
    a low pressure sensing port (22) disposed in a low pressure region downstream of the high pressure sensing port (21), and in fluid communication with the pilot valve (3);
    means for pressurizing the control fluid in the control fluid chamber (37), said means for pressurizing the control fluid operable from the outside of the conduit after the valve is installed in the conduit;
    a flange (5) secured to the main valve; wherein
    the means for pressurizing the control fluid (37) is disposed at least partially within the flange, and
    a control fluid reservoir (36) disposed within the flange (5); wherein
    the means for pressurizing the control fluid (37) comprises a screw or plunger disposed within the reservoir, with a head accessible from the outer surface of the flange.

4. The flow control valve of claim 3 further comprising:
    a high pressure PT port (43) in fluid communication with a high pressure region proximate the inlet (4) of the main valve (2), said high pressure PT port accessible from outside of the conduit after the valve is installed in the conduit; and a low pressure PT port (44) in fluid communication a low pressure region downstream of the high pressure sensing port, said low pressure PT port accessible from outside of the conduit after the valve is installed in the conduit.

5. The flow control valve of claim 4 wherein:

the high pressure PT port (43) is in fluid communication with a high pressure region proximate the inlet of the main valve through the high pressure sensing port (21); and the low pressure PT port (44) is in fluid communication a low pressure region downstream of the high pressure sensing port through the low pressure sensing port (22).

6. A flow control valve for controlling flow through a conduit characterized by an inlet pipe and an outlet pipe comprising:

a main valve (2) having an inlet 4 and an outlet 7, said main valve operable to throttle fluid flow through a conduit (41, 42);

a pilot valve (3) operable to control a position of the main valve (2), said pilot valve having a control fluid chamber (33), wherein the pressure of control fluid in the control fluid chamber determines a pressure set point of the pilot valve;

a high pressure sensing port (21) disposed in a high pressure region proximate the inlet of the main valve (2), and in fluid communication with the pilot valve (3);

a low pressure sensing port (22) disposed in a low pressure region downstream of the high pressure sensing port (21), and in fluid communication with the pilot valve (3);

means for pressurizing the control fluid in the control fluid chamber (37), said means for pressurizing the control fluid operable from the outside of the conduit after the valve is installed in the conduit; and a flange (5) secured to the main valve (2); wherein a bore of the flange forms the inlet (4) of the main valve, and said bore is configured as a Venturi nozzle (20), and the high pressure sensing port (21) is disposed in an upstream face of the flange; and the low pressure region in which the low pressure sensing port (22) is disposed is proximate the outlet of the Venturi nozzle (20).

7. The flow control valve of claim 1 wherein:

the main valve (2) comprises a tube (8) with an aperture (10) extending along the length of the tube, and a piston (11) slidably disposed within the tube (8), such that translation of the piston (11) within the tube (8) in a first direction blocks an increasing portion of the aperture (10), and translation of the piston (11) within the tube (8) in a second direction blocks a decreasing portion of the aperture (10); and an everting diaphragm (12) secured to the piston (11), and an operating chamber (13) disposed on a first side of the everting diaphragm (12), in fluid communication with the pilot valve (3), wherein the pilot valve (3) is operable transmit high pressure fluid from the high pressure sensing port (21) to the operating chamber (13) when a difference between the pressure in the high pressure region and the pressure in the low pressure region is sufficient to overcome the pressure in the control fluid chamber (33) and open the pilot valve (3).

8. The flow control valve of claim 7 wherein:

the tube (8) and piston (11) are disposed downstream from the inlet, and pilot valve (3) is disposed downstream of the main valve (2), and the tube is disposed on a flange (8).

9. A flow control valve for controlling flow through a conduit characterized by an inlet pipe and an outlet pipe, said flow control valve comprising:

a main valve operable to throttle fluid flow through a conduit, said main valve comprising an inlet configured as a Venturi nozzle, an outlet tube with a bore providing a fluid pathway to an aperture in the outlet tube, a piston translatably disposed within the outlet tube to occlude the aperture to a varying extent, and an everting diaphragm operably secured to the piston, and a main valve operating chamber disposed on a side of the everting diaphragm;

a high pressure sensing port disposed in a high pressure region of the inlet, and a low pressure sensing pot disposed in a low pressure region of the inlet;

a pilot valve having a pilot valve output communicating with the main valve operating chamber, operable to port high pressure fluid to the main valve operating chamber to force the piston to translate within the tube, said pilot valve having a plunger and a diaphragm operable to move the plunger into and out of occlusion with the pilot valve output, and a high pressure chamber on a first side of the diaphragm and a low pressure chamber on a second side of the diaphragm, a biasing plate forming a boundary of the low pressure chamber and positioned to exert a biasing force on the diaphragm, and a biasing spring disposed between the biasing plate and the diaphragm, and a control fluid chamber for applying control fluid to the biasing plate on a side of the plate outside the low pressure chamber;

a high pressure port communicating with the high pressure chamber, in fluid communication with the high pressure sensing port in the flange;

a low pressure port communicating with the low pressure chamber, in fluid communication with the low pressure sensing port in the flange;

a control fluid reservoir disposed in the flange, in fluid communication with the control fluid chamber of the pilot valve, and a mechanism for pressurizing the control fluid reservoir, to thereby pressurize the control fluid in the control fluid chamber; and a high pressure PT port, disposed on the flange, in fluid communication with the high pressure sensing port and a low pressure PT port, disposed on the flange, in fluid communication with the low pressure sensing port.

* * * * *